United States Patent [19]

Wright

[11] Patent Number: 5,143,802
[45] Date of Patent: Sep. 1, 1992

[54] ELECTROCHEMICAL CELL

[75] Inventor: Michael Wright, Allestree, England

[73] Assignee: AABH Patent Holdings Societe Anonyme, Luxembourg

[21] Appl. No.: 667,299

[22] Filed: Mar. 11, 1991

[30] Foreign Application Priority Data

Mar. 12, 1990 [GB] United Kingdom ............... 9005483

[51] Int. Cl.$^5$ ........................................... H01M 10/39
[52] U.S. Cl. ..................................... 429/103; 429/112
[58] Field of Search ............................... 429/103, 112

[56] References Cited

U.S. PATENT DOCUMENTS

| | | | |
|---|---|---|---|
| 4,068,045 | 1/1978 | Abrams | 429/103 X |
| 4,546,055 | 10/1985 | Coetzer et al. | 429/103 |
| 4,588,662 | 5/1986 | McManis et al. | 429/112 X |
| 4,626,483 | 12/1986 | Bones et al. | 429/50 |
| 4,722,875 | 12/1988 | Wright | 429/103 |
| 4,797,333 | 1/1989 | Coetzer et al. | 429/103 |
| 4,910,105 | 3/1990 | Tilley et al. | 429/103 |
| 4,992,345 | 2/1991 | Meintjes et al. | 429/103 |

FOREIGN PATENT DOCUMENTS 2097992 11/1982 United Kingdom .
2132003 5/1986 United Kingdom .

Primary Examiner—Stephen Kalafut
Attorney, Agent, or Firm—Arnold, White & Durkee

[57] ABSTRACT

A high temperature rechargeable electrochemical cell which comprises a cell housing divided by a separator into an anode compartment and a cathode compartment. The anode compartment contains an active anode substance which is a molten alkali metal M, the separator being capable of conducting ions of the alkali metal of the anode therethrough. The cathode compartment contains a cathode comprising an electronically conductive electrolyte-permeable porous matrix having, dispersed therein, a solid active cathode substance the matrix being impregnated with a molten salt electrolyte. The cathode comprises also, in contact with the matrix, a porous, electrolyte-permeable reservoir of material which is electrochemically and chemically inert in the cathode environment, said reservoir having an ability to wick the molten salt electrolyte at the operating temperature of the cell which ability is less than the ability of the matrix to wick said molten salt electrolyte.

16 Claims, 2 Drawing Sheets

ELECTROCHEMICAL CELL

THIS INVENTION relates to a high temperature electrochemical power storage cell. More particularly, the invention relates to an electrochemical cell of the type comprising an electronically conductive porous electrolyte-permeable matrix having solid active cathode substance dispersed therein and being impregnated with a molten salt electrolyte. The invention relates also to a cathode assembly for such cell and to a method of making a precursor for a cathode for such cell.

According to one aspect of the invention there is provided a high temperature rechargeable electrochemical power storage cell which comprises a cell housing divided by a separator into an anode compartment and a cathode compartment, the anode compartment containing an active anode substance which is an alkali metal M and the cell having an operating temperature at which the alkali metal is molten, the separator being capable of conducting ions of the alkali metal of the anode therethrough during charge/discharge cycling of the cell at said operating temperature, and the cathode compartment containing a cathode comprising an electronically conductive electrolyte-permeable porous matrix having, dispersed therein, an active cathode substance which is solid at the operating temperature, the cell having a charged state in which the active cathode substance has the formula $THal_2$ in which the Hal is a halide and T is a transition metal selected from the group consisting of Fe, Ni, Cr, Co, Mn, Cu and mixtures thereof, the matrix being impregnated with an alkali metal haloaluminate molten salt electrolyte which is molten at the operating temperature of the cell and has as its alkali metal the same alkali metal M as that of the anode and comprises the same halide Hal as that of the active cathode substance $THal_2$, the atomic ratio of Al:M in the molten salt electrolyte being at most 1:1, the cathode comprising also, in contact with the matrix, a porous, electrolyte-permeable reservoir of material which is electrochemically and chemically inert in the cathode environment, said reservoir having an ability to wick the molten salt electrolyte at the operating temperature of the cell which is less than the ability of the matrix to wick said molten salt electrolyte, the cell having a fully discharged state in which the matrix is saturated with said molten salt electrolyte and the reservoir containing sufficient said molten salt electrolyte impregnated therein to ensure that the matrix remains saturated therewith during charging of the cell.

The separator may comprise a solid electrolyte, or a micromolecular sieve carrier having a porous interior in which the alkali metal M of the anode is sorbed (i.e. absorbed and/or adsorbed). The molten salt electrolyte will have a formula which can be represented, substantially, by $MAlHal_4$, and will typically be in contact with some solid MHal in the cathode compartment, so that the atomic ratio of Al:M therein will be very slightly less than 1:1.

The separator may be in the form of a tube, the cathode compartment being defined by the interior of the tube, the tube being located in the interior of the housing and the anode compartment being provided by the interior of the housing outside the tube.

Accordingly, the matrix may have a cylindrical outer surface which extends lengthwise over substantially the full length of the separator tube, the reservoir extending lengthwise along the full length of the matrix. The matrix may be annular, having a central passage along its length which contains the reservoir. Instead the matrix may be composite and segmented, being divided by radially and longitudinally extending spaces into a plurality of segments which are spaced circumferentially in series from one another, said radially and longitudinally extending spaces containing the reservoir.

The separator may comprise a solid electrolyte selected from $\beta$-alumina, $\beta''$-alumina and mixtures thereof, the alkali metal of the anode comprising sodium, and $MAlHal_4$ being $NaAlCl_4$.

The reservoir may comprise a porous particulate mass occupying at least one space provided therefor in the cathode compartment. The particles of the particulate mass may be of a material having a surface which, at the operating temperature of the cell, exhibits a contact angle with regard to the molten salt electrolyte which is less than 90°, the matrix being of a material having a surface which, at said temperature, exhibits a contact angle with regard to the molten salt electrolyte which is >90°. The particulate mass may have a percentage porosity as defined herein of >80%; and may be selected from carbon particles, glass particles, alumino-silicate particles and mixtures thereof. The particles may be in the form of fibres, so that the particulate mass is a fibrous mass; and the matrix and separator may be opposed to each other and sufficiently close to each other to ensure that, at the operating temperature of the cell and in all states of charge of the cell, any space between the matrix and separator remains flooded by molten salt electrolyte held captive therein by wicking arising from capillary action. Preferably, the reservoir is in communication with any space between the matrix and separator.

In accordance with another aspect of the invention there is thus provided a cathode assembly for a high temperature rechargeable electrochemical power storage cell as described above, the cathode assembly defining a cathode compartment and comprising a separator which is a conductor of ions of an alkali metal M, the separator forming a wall of the cathode compartment and the cathode assembly comprising, located in the cathode compartment, a cathode comprising an electronically conductive electrolyte-permeable porous matrix having, dispersed therein, an active cathode substance, the cathode having a charged state in which the active cathode substance has the formula $THal_2$ in which Hal is a halide and T is a transition metal selected from the group consisting of Fe, Ni, Cr, Co, Mn, Cu and mixtures thereof, the matrix being impregnated with an alkali metal haloaluminate molten salt electrolyte which has as its alkali metal the same alkali metal M as that whose ions the separator is capable of conducting, the molten salt electrolyte comprising the same halide Hal as that of the active cathode substance $THal_2$, the cathode having an operating temperature at which the active cathode substance is solid and the alkali metal M and electrolyte $MAlHal_4$ are molten and at which the separator conducts ions of the alkali metal M, the atomic ratio of Al:M in the electrolyte $MAlHal_4$ being at most 1:1, the cathode comprising also, in contact with the matrix, a porous, electrolyte-permeable reservoir of material which is electrochemically and chemically inert in the cathode environment, and said reservoir having an ability to wick the molten salt electrolyte at the cathode operating temperature which ability is less than the ability of the matrix to wick said electrolyte at said temperature, the cathode assembly having a fully discharged state in which the matrix is saturated with said molten salt electrolyte and the reservoir containing sufficient said molten salt electrolyte impregnated therein to ensure that the matrix remains saturated therewith during charging of the cathode assembly.

The invention extends also to a method of making a precursor of a cathode for a high temperature rechargeable electrochemical storage cell as described above, the method including the steps of loading, into the cathode compartment of such cell, a particulate mixture having, as constituents, particles of alkali metal halide MHal and transition metal T in which M, Hal and T are as defined above, and, together with this mixture, loading into the cathode compartment a porous electrolyte-permeable reservoir of material, and impregnating both said particulate mixture and said reservoir with an alkali metal haloaluminate which has as its alkali metal the molten salt liquid electrolyte the same alkali metal M as that of the alkali metal halide MHal, the molten salt electrolyte comprising the same halide Hal as that of said alkali metal halide MHal, the material of the reservoir being electrochemically and chemically inert in the cathode environment, and the material of the reservoir having an ability to wick the molten salt electrolyte at the operating temperature of a said cell which ability is less than the ability at said temperature of the particulate mixture to wick said electrolyte, sufficient molten salt liquid electrolyte being impregnated into the particulate mixture and reservoir to ensure that, after the cathode precursor has been fully charged in a said electrochemical cell to convert the particulate mixture into a cathode having a porous electrolyte-permeable matrix having $THal_2$ active cathode substance dispersed therein, the matrix is saturated with said electrolyte.

Cathodes of cells of the abovedescribed type, may be initially loaded with a cathode precursor which may form part of a cathode assembly as described above, the precursor comprising a particulate mixture having constituents which are discharge products of the discharge reaction of the cathodes in question, the mixture being impregnated with said alkali metal haloaluminate molten salt liquid electrolyte.

Cathode precursors of this type are described, for example, in U.S. Pat. No. 4,722,875 and U.S. Pat. No. 4,797,333.

In cells of the type described above there is, as indicated above, typically a tubular solid electrolyte separator, e.g. of nasicon, or preferably β-alumina and/or β''-alumina, located in a cell housing, the interior of the separator tube forming the cathode compartment and the interior of the housing, outside the cathode compartment, forming the anode compartment. In the charged cell the active anode material is a molten alkali metal, e.g. sodium, and the cathode, in its charged state, comprises an electronically conductive porous, electrolyte-permeable matrix having, dispersed therein, solid electrochemically active cathode substance of formula $THal_2$ in which Hal is a halide and T is a transition metal selected from the group consisting of Fe, Ni, Cr, Co, Mn, Cu and mixtures thereof. The matrix is impregnated with a molten salt liquid electrolyte of formula $MAlHal_4$, in which M is the alkali metal of the anode and Hal is a halide which comprises the same halide Hal as the active cathode substance $THal_2$. Such cells have, as their discharge reaction:

$$2M + THal_2 \rightarrow 2MHal + T$$

Instead of a solid electrolyte separator, the separator may, as indicated above, be a micromolecular sieve carrier, having its pores impregnated with the alkali metal M of the anode, although solid electrolyte conductors of ions of the anode metal M are preferred. As indicated above, sodium is usually the preferred anode material; while β''-alumina and Cl are usually respectively the preferred separator and halide Hal. In the liquid electrolyte, the atomic ratio of Al:M in the charged cell should be at most 1:1.

Abovementioned U.S. Pat. No. 4,722,875 describes a method of loading cells of the type in question with a cathode precursor in the form of a particulate mixture of the discharge reaction products of cathodes of such cells, i.e. a mixture of alkali metal halide MHal and transition metal T, impregnated with liquid electrolyte $MAlHal_4$; and above U.S. Pat. No. 4,797,333 describes loading with a similar particulate mixture containing, in addition, particulate aluminum, so that the precursor comprises a mixture of reaction products obtained from the over-discharge of cathodes of such cells.

The porous reservoir, while it may in principle be a solid integral or unitary body, is conveniently in the form, as indicated above, of a mass of particles or fibres, so that it can assume the size and shape of a space provided therefor in the cathode compartment.

The ability of the porous reservoir to wick the liquid electrolyte depends, inter alia, importantly on the average pore size of its porous interior and also on surface tension effects (i.e. the wettability of the surface of its material by the liquid electrolyte). Thus, within the limits imposed by sufficient permeability of the porous reservoir to the molten salt liquid electrolyte, the smaller the average pore size, in general, the better the wicking ability of a porous mass or body, and the higher the average pore size, the poorer the wicking ability. Similarly, the better the wettability of the surface of the material of the porous mass or body the better its wicking ability, and the poorer the wettability, the poorer its wicking ability.

A measure of wettability of a surface by a liquid is the contact angle which the liquid exhibits with respect to said surface, a low contact angle of e.g. less than 90° being an indicator of good wettability, and a high contact angle of e.g. greater than 90° being an indication of poor wettability. Examples of poorly wettable materials having a suitably poor wicking ability for use in the reservoir comprise masses of particles, i.e. granules or preferably fibres, of carbon, glass or alumino-silicate (α-alumina). Preferably said particles form a mass having a percentage porosity (where percentage porosity is defined by:

$$\text{percentage porosity} = \left(1 - \frac{\text{bulk density}}{\text{actual density}} \times 100\right)$$

of at least 80%, the maximum value being set by the ability of the mass to form a barrier which prevents particles of cathode precursor from entering and filling the interior volume of the reservoir, and the lower limit being set to prevent the reservoir from having too good a wicking ability. A value of about 95% for a mass of carbon fibres has been found to be suitable.

When the cathode matrix is in a separator tube, the reservoir may, as indicated above, extend lengthwise along the tube, preferably over the full length of the cathode matrix, e.g. as a central cylindrical core or a diametrically extending slab separating the matrix into two roughly semi-cylindrical segments. The matrix may thus be segmented, the reservoir being provided in radially extending gaps between the segments, the matrix naturally preferably extending along substantially the full length of the tube.

In use, as a cell or cathode according to the invention is charged, alkali metal is conducted through the separator from the cathode compartment into the anode compartment. It is desirable for the liquid electrolyte fully to saturate and flood the cathode matrix at all times and to wet the cathode-side surface of the separator fully at all times, while occupying the space, if any, between the matrix of the cathode and the separator, to provide for good conductivity of ions of the metal of the anode between the interior of the matrix to the separator. Any space between the matrix and separator should thus, as indicated above, be thin enough for effective wicking of molten salt liquid electrolyte therein by capillary action.

Furthermore, during charging, the volume of material in the cathode compartment will reduce, as alkali metal ions pass through the separator to provide alkali metal in the anode compartment. The volume of the reservoir and its percentage porosity are thus selected so that it contains sufficient electrolyte in the discharged state to compensate for said reduction in volume of material in the cathode compartment during charging.

This percentage porosity of the mass of material in the reservoir, together with the wettability of the reservoir material and the average pore size of the mass of the material, are ideally selected so that, as the level of the electrolyte in the cathode compartment drops during charging, electrolyte wicks from the reservoir into the cathode matrix to ensure that the matrix remains saturated and flooded with electrolyte at all times, the reservoir correspondingly becoming starved or depleted of electrolyte. Thus the level of electrolyte in the reservoir can drop, and/or electrolyte-free spaces can form in the reservoir. To keep any space between the cathode matrix and the separator flooded with electrolyte, the reservoir is preferably in communication with any space or spaces between the cathode matrix and the separator; and any electrolyte-free spaces in the reservoir which form on charging will be filled by electrolyte vapour and/or by inert gas, if the cathode compartment contains inert gas under pressure, which is often the case.

The effect of the invention is accordingly to provide a cell and cathode in which saturation or flooding of the cathode matrix and any space between the matrix and the separator is promoted, at all states of charge. Furthermore, matrix thickness can be reduced by the presence of the reservoir, so that ionic pathways along which ions of alkali metal have to diffuse between active cathode substance in the matrix and the separator are reduced, and the reservoir, where it communicates with any space between the matrix and the separator, provides ionic pathways which are less tortuous than pathways through the matrix itself, further facilitating this diffusion. This can promote high power and/or rates of discharge of the cell. As indicated above, the particles or fibres of the reservoir also prevent the reservoir space from becoming filled by particles when a cathode precursor is loaded in particle form. Furthermore, during use of the cell in which the cathode comprises a matrix, the matrix can at certain states of charge crumble somewhat, passing through phases when it is less unitary or integral than at others, and the particles or fibres of the reservoir prevent pieces or particles from the matrix from crumbling into the reservoir space, thereby becoming separated from the bulk of the matrix, which separation can reduce usable cathode capacity.

The invention will now be described, by way of example, with reference to the accompanying diagrammatic drawings, in which.

Figure 1:
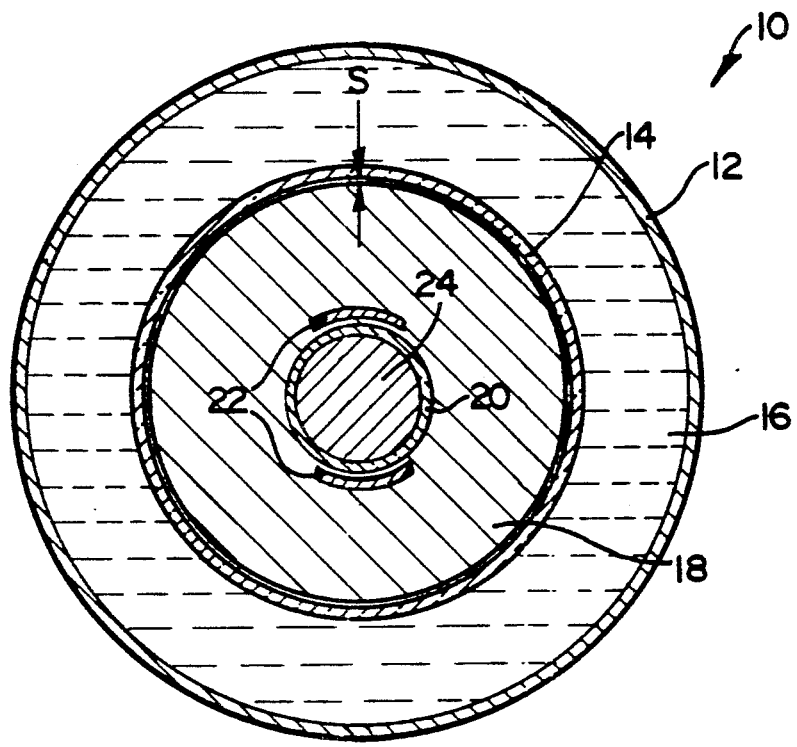
FIG. 1 shows a schematic sectional plan view of a cell, not in accordance with the present invention, shown for comparative purposes.

In FIG. 1 of the drawings is shown a cell generally designated 10, not in accordance with the present invention but similar to cells according to the invention, which the Applicant has employed extensively on an experimental scale. The cell comprises a mild steel housing 12 which is elongated and cylindrical in shape, and, concentrically arranged therein and radially spaced therefrom, is a $\beta''$-alumina separator tube 14, of the type closed at its lower end, and open at its upper end. The tube 14 is spaced radially, and at its ends, from the housing 12, and the cylindrical annular space between the housing 12 and tube 14 contains sodium active anode material 16 which is molten at the operating temperature of the cell.

Suitable sealing and connecting means (not shown) are provided in the cell of conventional type, whereby the tube 14 is connected to and suspended from a closure (not shown) at the upper end of the housing 12. The tube 14 is electronically insulated from the closure, the cell including also sealing means (not shown), whereby the interior of the tube 14 is hermetically sealed off and isolated from the space between the tube 14 and housing 12. The interior of the tube 14 forms a cathode compartment, the space between the tube 14 and housing 12 forming an anode compartment.

In the interior of the tube 14 there is provided a cathode structure 18 which comprises a macroporous (as contrasted with microporous at the atomic or molecular level) matrix of porous nickel, within the interior pores of which is dispersed electrochemically active cathode substance, which, in the fully charged state of the cell, is $NiCl_2$.

The matrix of the cathode structure 18 is hollow-cylindrical and annular in shape, and has a central passage therein, occupied by a glass tube 20. The glass tube 20 extends substantially the full length of the matrix of the cathode structure 18, which structure 18 in turn extends substantially the full length of the separator tube 14. The glass tube 20 is open at opposite ends thereof, which ends contain electrolyte-permeable carbon felt plugs (not shown).

Shown in FIG. 1 are two limbs of a bifurcated nickel current collector 22. These limbs extend the length of the matrix of the cathode structure 18, and are in the form of straight metal bars having a curved cross-section, seating against diametrically opposed sides of the glass tube 20, being otherwise embedded in the matrix of the cathode structure 18. At the top of the cell they are connected together, and pass out of the top of the cell from the cathode compartment in the form of a nickel cathode terminal post through insulation in the closure of the housing 14, which housing is in the form of a can-like casing of mild steel.

In the construction of the cell of FIG. 1, the matrix of the cathode 18 is separated from the separator tube 14 by a narrow annular cylindrical capillary space S. The matrix of the cathode structure 18 is saturated and flooded with sodium aluminum chloride liquid molten salt electrolyte of formula NaAlCl$_4$, which in the fully charged state of the cell has an atomic ratio of Al:Na which is at most 1:1. This liquid electrolyte fills the space S and at least partially fills the interior of the glass tube 20, where it is shown at 24. Typically, in the fully charged state of the cell, there is some solid NaCl dispersed in the interior pores of the matrix of the cathode 18. This NaCl ensures that said Al:Na atomic ratio is always slightly less than 1:1 by ensuring that the liquid sodium chloroaluminate electrolyte remains at all times saturated with regard to NaCl.

In use the cell operates according to the charge/discharge reaction:

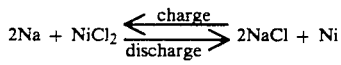

$$2Na + NiCl_2 \underset{discharge}{\overset{charge}{\rightleftarrows}} 2NaCl + Ni$$

During discharging sodium 16 passes through the separator 14 in ionic form into the electrolyte 24, the cell reaction taking place in the porous interior of the matrix of the cathode structure 18. During charging, correspondingly, sodium ions move in the opposite direction from the interior of the cathode structure matrix through the separator 14 and into the anode compartment defined between the tube 14 and housing 12.

There is accordingly during charging a decrease in the volume of the contents of the cathode compartment defined by the interior of the tube 14. This volume decrease is manifested by a drop in the level of the electrolyte 24 in the tube 20.

Accordingly, the tube 20 must contain sufficient electrolyte 24 in the discharged state of the cell, to diffuse through at least the plug at the lower end of the tube 20 into the cathode structure matrix, to ensure that the porous interior of the matrix and the space S between the matrix and tube 14 remain, as far as possible, fully saturated and flooded at all times by electrolyte during charging, and particularly when the cell is fully charged, electrolyte migrating by capillary action from the interior of the tube 20 into said matrix and space S.

Figure 2:
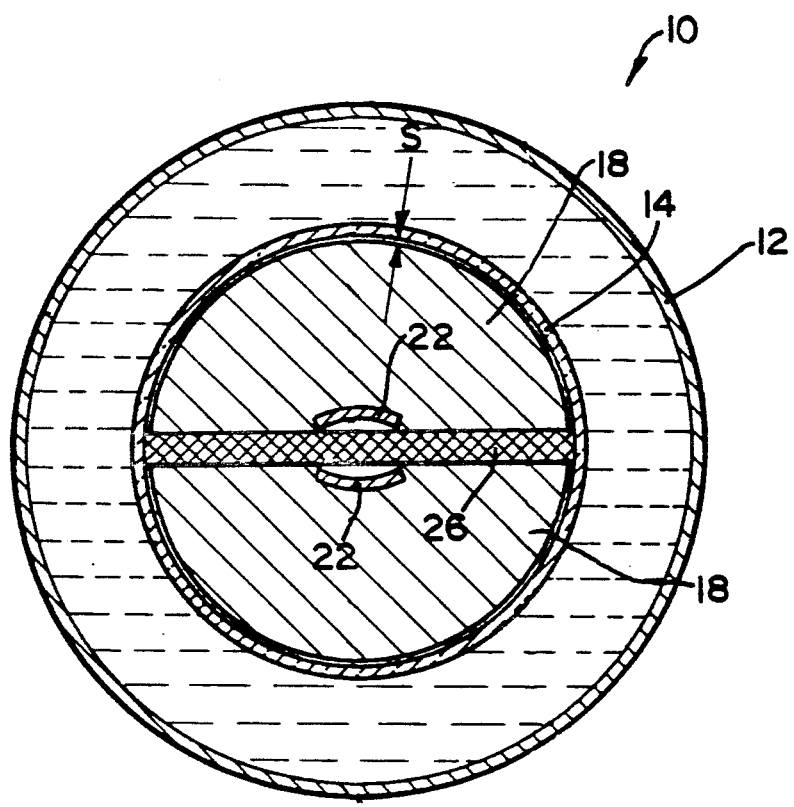
FIG. 2 shows a similar view of a cell according to the invention.
Figure 3:
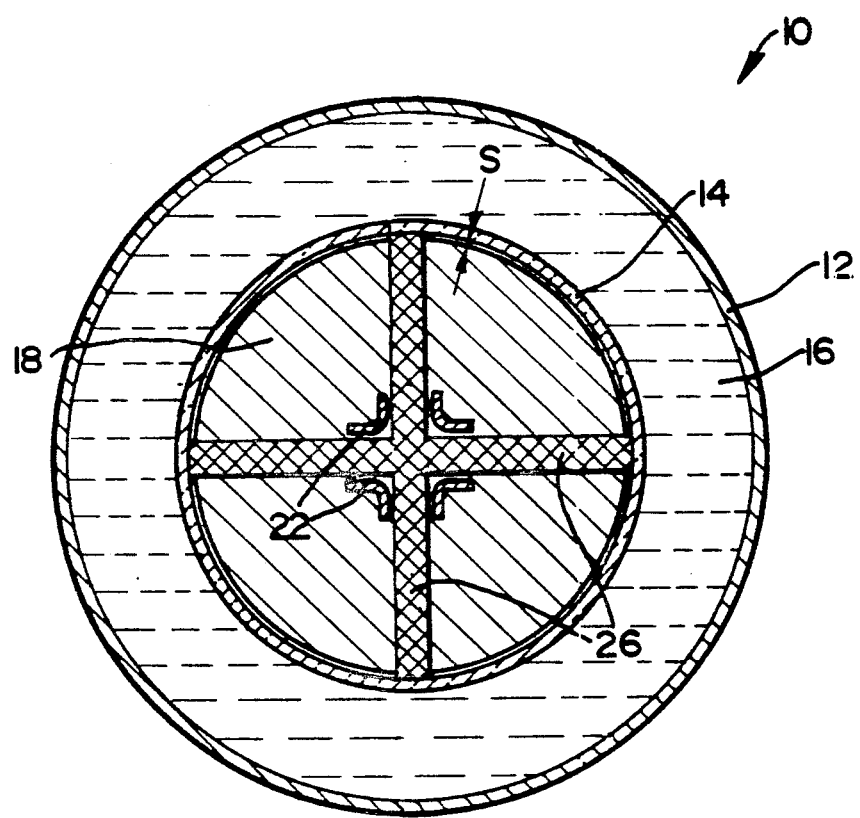
FIG. 3 shows a similar view of another cell according to the invention.

Turning now to FIGS. 2 and 3, cells in accordance with the invention are again respectively designated 10. These cells are broadly similar in construction to the cell of FIG. 1, and, unless otherwise specified, like reference numerals refer to like parts which have a similar function. Indeed, where not specified, the construction and function of the cells 10 of FIGS. 2 and 3 is the same as that described above for FIG. 1.

Dealing with FIG. 2, the matrix of the cathode structure 18, instead of being of hollow cylindrical shape as shown in FIG. 1, is in the shape of two semi-cylindrical halves. These halves are separated by a slab 26 of carbon fibre felt, saturated with liquid electrolyte (the same as the electrolyte 24 shown in FIG. 1). The bifurcated cathode current collector 22 is similar in construction to that shown in FIG. 1 and its limbs join together at the top of the cell to leave the cell as a terminal post. Naturally, as indicated above, this terminal post passes through a space sealed off from the interior of the anode compartment and is insulated from the lid of the housing 12.

In FIG. 3, a broadly similar slab 26 is shown, except that it is cruciform in cross-section, and can be regarded as two of the slabs 26 of FIG. 2, normal to each other and intersecting at the center of the cell. Once again the slab 26 of FIG. 3 is saturated with said electrolyte, and in the case of FIG. 3 the nickel current collector 22 has four limbs which join together at the top of the cell to form the terminal post, the cathode matrix being divided into four quarters each served by one of the limbs of the current collector 22.

In FIG. 3, the matrix can be regarded as being composite and segmented, being divided into four segments by four radially and longitudinally extending spaces which contain the slabs 26 making up the reservoir. By analogy, the matrix of FIG. 2 can be regarded as two semi-cylindrical segments, spaced apart by two said radially and longitudinally extending spaces which contain the slabs 26.

The carbon felt slab has a percentage porosity of 95–97% and is formed of carbon fibres which exhibit as high a possible contact angle ($>90°$) with regard to molten liquid electrolyte in contact therewith, so that they are not easily wettable by said electrolyte.

The felt slab 26, while it is porous and permeable to liquid electrolyte, thus exhibits a wicking ability with regard to said liquid electrolyte which is as low as possible, and less than the wicking ability with regard to said liquid electrolyte of the porous matrix of the cathode structure 18 (the contact angle of the matrix with regard to the liquid electrolyte being $<90°$). The slab 26 is in face-to-face contact with the cathode structure 18, so that when the cell is charged and the material in the cathode structure matrix undergoes a reduction in volume arising from sodium ion conduction into the anode compartment, electrolyte in the slab 26 wicks and diffuses by capillary action from the felt slab 26 into the matrix of the cathode structure 18.

Naturally, as indicated above with reference to FIG. 1, there is sufficient electrolyte loaded initially into the slab 26 to ensure that, in the fully charged state of the cell, the cathode matrix and annular space S remain flooded and fully saturated with electrolyte during all states of charge, and particularly in the fully charged state.

Cells of the type shown in the drawings have a nominal typical operating temperature of 290°–300° C. The Applicant has found, with cells of the type shown in FIG. 1, that overheating can take place during rapid discharging, resulting in temperatures of up to 400° C. or more, particularly when such cells are arranged in a battery. This heating leads to impaired operation of the cells, in that they fail to accept a full charge during the subsequent charge cycle, the loss of capacity being up to 30% or more. The subsequent discharge cycle, after this partial charging, takes place with a high initial internal resistance, which improves thereafter as said charge cycle progresses. Once this discharge cycle has been completed, the cell thereafter functions substantially normally.

The Applicant has been able to mimic such discharge self-heating, by soaking a discharged cell at 400° C. for 16 hours, to obtain a similar subsequent impaired charge cycle, the cell after the discharge cycle which follows the impaired charge cycle, again functioning normally.

In contrast, cells in accordance with FIG. 2 can be charged normally, without any reduction in capacity, during the first charge cycle after soaking in a fully discharged state at 400° C. for 16 hours.

Increasing the area of felt slab 26 in contact with the cathode structure matrix compared with FIG. 2, by adopting the construction in FIG. 3, showed no improvement in this regard, the cell of FIG. 3 showing essentially the same improved results as that of FIG. 2.

The Applicant is unable to explain the reason for the loss of charging capacity in the cells of FIG. 1 after overheating during discharge, but, without being bound by theory, believes that the porosity of the cathode structure matrix may be such that lengthy, narrow, tortuous pathways are provided for sodium ion diffusion during charging between the $NiCl_2$ active cathode substance in the matrix and the surface of the matrix spaced by the spacing S from the separator tube 14; and, correspondingly, difficulty may be encountered in diffusion of liquid electrolyte along these tortuous pathways between the central reservoir in the tube 20 (FIG. 1) and the porous interior of the cathode structure matrix.

Nevertheless, the present invention overcomes the problem displayed by cells in accordance with FIG. 1, whatever the cause of this problem. In this regard the Applicant believes that it may be important to keep the space S as thin or narrow as possible, within fabrication tolerances, so that the cathode structure matrix is as close as possible to being in face-to-face contact with the separator tube 14. Furthermore, the Applicant believes that it is important for the cathode reservoir filled by the slab 26 to communicate in the radial direction with the annular space S, or at least to be exposed in the radial direction to the inner surface of the separator tube 14. Other factors which may contribute to the utility of the present invention include, importantly, the relatively low wicking ability of the felt slab 26, compared with the cathode structure matrix, provided by the relatively low wettability of the carbon fibres and the high percentage porosity of the mass thereof provided by the felt. However, as mentioned above, the Applicant does not wish to be bound by theory in this regard.

It should be noted that the Applicant has obtained similar results with felts of glass fibres and aluminosilicate fibres such as α-alumina fibres which are electronically non-conducting, as contrasted with the carbon fibres of the felt in the slabs 26, which are electronically conducting.

It should also be noted that the construction of the cell of FIG. 1 can be altered, to transform the cell of FIG. 1 into a cell in accordance with the present invention by removing the glass tube 20 and filling the interior space of the matrix of the cathode 18 with a porous mass of fibres such as those mentioned above for the slabs 26.

I claim:

1. A high temperature rechargeable electrochemical power storage cell which comprises a cell housing divided by a separator into an anode compartment and a cathode compartment, the anode compartment containing an active anode substance which is an alkali metal M and the cell having an operating temperature at which the alkali metal is molten, the separator being capable of conducting ions of the alkali metal of the anode therethrough during charge/discharge cycling of the cell at said operating temperature, and the cathode compartment containing a cathode comprising an electronically conductive electrolyte-permeable porous matrix having, dispersed therein, an active cathode substance which is solid at the operating temperature, the cell having a charged state in which the active cathode substance has the formula $THal_2$ in which Hal is a halide and T is a transition metal selected from the group consisting of Fe, Ni, Cr, Co, Mn, Cu and mixtures thereof, the matrix being impregnated with an alkali metal haloaluminate molten salt electrolyte which is molten at the operating temperature of the cell and has as its alkali metal the same alkali metal M as that of the anode and comprises the same halide Hal as that of the active cathode substance $THal_2$, the atomic ratio of Al:M in the molten salt electrolyte being at most 1:1, the cathode comprising also, in contact with the matrix, a porous, electrolyte-permeable reservoir of material which is electrochemically and chemically inert in the cathode environment, said reservoir having an ability to wick the molten salt electrolyte at the operating temperature of the cell which ability is less than the ability of the matrix to wick said molten salt electrolyte, the cell having a fully discharged state in which the matrix is saturated with said molten salt electrolyte and the reservoir containing sufficient said molten salt electrolyte impregnated therein to ensure that the matrix remains saturated therewith during charging of the cell.

2. A cell as claimed in claim 1, in which the separator is in the form of a tube, the cathode compartment being defined by the interior of the tube, the tube being located in the interior of the housing and the anode compartment being defined by the interior of the housing outside the tube.

3. A cell as claimed in claim 1, in which the matrix has a cylindrical outer surface which extends lengthwise over substantially the full length of the separator tube, the reservoir extending lengthwise along the full length of the matrix.

4. A cell as claimed in claim 3, in which the matrix is annular, having a central passage along its length which contains the reservoir.

5. A cell as claimed in claim 3, in which the matrix is composite and segmented, being divided by radially and longitudinally extending spaces into a plurality of segments which are spaced circumferentially in series from one another, said radially and longitudinally extending spaces containing the reservoir.

6. A cell as claimed in claim 1, in which the separator comprises a solid electrolyte selected from β-alumina, β"-alumina and mixtures thereof, the alkali metal of the anode comprising sodium, and $MAlHal_4$ being $NaAlCl_4$.

7. A cell as claimed in claim 1, in which the reservoir comprises a porous particulate mass occupying at least one space provided therefor in the cathode compartment.

8. A cell as claimed in claim 7, in which the particles of the particulate mass are of a material having a surface which, at the operating temperature of the cell, exhibits a contact angle with regard to the molten salt electrolyte which is greater than 90°, the matrix being of a material having a surface which, at said temperature, exhibits a contact angle with regard to the molten salt electrolyte which is less than 90°.

9. A cell as claimed in claim 7, in which the particulate mass has a percentage porosity of >80%.

10. A cell as claimed in claim 7, in which the particles are selected from carbon particles, glass particles, alumino-silicate particles and mixtures thereof.

11. A cell as claimed in claim 7, in which the particles are in the form of fibres, so that the particulate mass is a fibrous mass.

12. A cell as claimed in claim 1, in which the matrix and separator are opposed to each other and sufficiently close to each other to ensure that, at the operating temperature of the cell and in all states of charge of the cell, any space between the matrix and separator remains flooded by molten salt electrolyte held captive therein by wicking arising from capillary action.

13. A cell as claimed in claim 12, in which the reservoir is in communication with any space between the matrix and separator.

14. A cathode assembly for a high temperature rechargeable electrochemical power storage cell as claimed in any one of the preceding claims, the cathode assembly defining a cathode compartment and comprising a separator which is a conductor of ions of an alkali metal M, the separator forming a wall of the cathode compartment and the cathode assembly comprising, located in the cathode compartment, a cathode comprising an electronically conductive electrolyte-permeable porous matrix having, dispersed therein, an active cathode substance, the cathode having a charged state in which the active cathode substance has the formula $THal_2$ in which Hal is a halide and T is a transition metal selected from the group consisting of Fe, Ni, Cr, Co, Mn, Cu and mixtures thereof, the matrix being impregnated with an alkali metal haloaluminate molten salt electrolyte which has as its alkali metal the same alkali metal M as that whose ions the separator is capable of conducting, the molten salt electrolyte comprising the same halide Hal as that of the active cathode substance $THal_2$, the cathode having an operating temperature at which the active cathode substance is solid and the alkali metal M and electrolyte $MAlHal_4$ are molten and at which the separator conducts ions of the alkali metal M, the atomic ratio of Al:M in the electrolyte $MAlHal_4$ being at most 1:1, the cathode comprising also, in contact with the matrix, a porous, electrolyte-permeable reservoir of material which is electrochemically and chemically inert in the cathode environment, and said reservoir having an ability to wick the molten salt electrolyte at the cathode operating temperature which ability is less than the ability of the matrix to wick said electrolyte at said temperature, the cathode assembly having a fully discharged state in which the matrix is saturated with said molten salt electrolyte and the reservoir containing sufficient said molten salt electrolyte impregnated therein to ensure that the matrix remains saturated therewith during charging of the cathode assembly.

15. A method of making a precursor of a cathode for a high temperature rechargeable electrochemical power storage cell which comprises a cell housing divided by a separator into an anode compartment and a cathode compartment, the separator being capable of conducting ions of an alkali metal M and the cell having an operating temperature at which said alkali metal M is molten, the method including the steps of loading, into the cathode compartment of such cell, a particulate mixture having, as constituents, particles of alkali metal halide MHal and of a transition metal T in which M is the alkali metal which the separator is capable of conducting, Hal is a halide and T is a transition metal selected from the group consisting of Fe, Ni, Cr, Co, Mn, Cu and mixtures thereof and, together with this mixture, loading into the cathode compartment a porous electrolyte-permeable reservoir of material, and impregnating both said particulate mixture and said reservoir with an alkali metal haloaluminate molten salt electrolyte which has as its alkali metal the same alkali metal M as that of the alkali metal halide MHal, the molten salt electrolyte comprising the same halide Hal as that of said alkali metal halide MHal, the material of the reservoir being electrochemically and chemically inert in the cathode environment, and said reservoir having an ability to wick the molten salt electrolyte at the operating temperature of said cell which ability is less than the ability at said temperature of the particulate mixture to wick said electrolyte, sufficient molten salt liquid electrolyte being impregnated into the particulate mixture and reservoir to ensure that, after the cathode precursor has been fully charged in a said electrochemical cell to convert the particulate mixture into a cathode having a porous electrolyte-permeable matrix having $THal_2$ active cathode substance dispersed therein, the matrix is saturated with said electrolyte.

16. A precursor of a cathode for a high temperature rechargeable electrochemical power storage cell, whenever made in accordance with the method of claim 15.

* * * * *